United States Patent
Jiang et al.

(10) Patent No.: US 12,219,976 B2
(45) Date of Patent: Feb. 11, 2025

(54) METHOD FOR MODIFICATION OF MUNG BEAN PROTEIN AND PREPARATION OF SIMULATED EGG PULP BASED ON THE MODIFIED PROTEIN

(71) Applicant: Jiangnan University, Wuxi (CN)

(72) Inventors: Jiang Jiang, Wuxi (CN); Ying Wang, Wuxi (CN); Shucheng Zhang, Wuxi (CN); Youling Xiong, Wuxi (CN); Yuanfa Liu, Wuxi (CN)

(73) Assignee: Jiangnan University, Wuxi (CN)

( * ) Notice: Subject to any disclaimer, the term of this patent is extended or adjusted under 35 U.S.C. 154(b) by 215 days.

(21) Appl. No.: 17/516,164

(22) Filed: Nov. 1, 2021

(65) Prior Publication Data
US 2022/0046964 A1    Feb. 17, 2022

Related U.S. Application Data

(63) Continuation of application No. PCT/CN2021/100252, filed on Jun. 16, 2021.

(30) Foreign Application Priority Data

Dec. 4, 2020 (CN) .......................... 202011412262.0

(51) Int. Cl.
*A23L 15/00* (2016.01)
*A23L 5/30* (2016.01)

(52) U.S. Cl.
CPC .................. *A23L 15/35* (2016.08); *A23L 5/32* (2016.08); *A23L 15/25* (2016.08); *C12Y 203/02013* (2013.01)

(58) Field of Classification Search
CPC ..... C12Y 305/01044; C12Y 203/02013; A23J 3/14; A23L 15/25; A23L 5/32; A23L 15/35
(Continued)

(56) References Cited

U.S. PATENT DOCUMENTS

2014/0356507 A1* 12/2014 Tetrick .................. A23L 29/238
426/654
2019/0191735 A1*  6/2019 Bansal-Mutalik ..... A21D 2/266

FOREIGN PATENT DOCUMENTS

CN   105533117 A   5/2016
CN   110050873 A   7/2019
(Continued)

*Primary Examiner* — Subbalakshmi Prakash
(74) *Attorney, Agent, or Firm* — IPRO, PLLC

(57) ABSTRACT

The present disclosure discloses a method for modification of mung bean protein and preparation of simulated egg pulp based on the modified protein. A commercial mung bean protein isolate is used as a raw material in the present disclosure, then subjected to pH shift modification, ultrasonic treatment and protein-glutaminase treatment for compound modification to prepare a high-functionality modified mung bean protein isolate; and the modified mung bean protein isolate is used as a raw material, using high-speed emulsification and high-pressure homogenization are conducted to obtain a high-stability mung bean protein-based simulated egg pulp. In the present disclosure, the mung bean protein isolate prepared by compound modification has good solubility, emulsifying property and gelling property. The mung bean protein-based simulated egg pulp is in the form of a stable emulsion and has good fluidity and moderate gelling property, and uniformity and stability can still be maintained for a long time.

9 Claims, 5 Drawing Sheets

(58) Field of Classification Search
USPC .......................................................... 426/656
See application file for complete search history.

(56) References Cited

FOREIGN PATENT DOCUMENTS

| CN | 110338262 A | 10/2019 |
|----|-------------|---------|
| CN | 111053145 A | 4/2020  |
| CN | 112544776 A | 3/2021  |

* cited by examiner

METHOD FOR MODIFICATION OF MUNG BEAN PROTEIN AND PREPARATION OF SIMULATED EGG PULP BASED ON THE MODIFIED PROTEIN

TECHNICAL FIELD

The present disclosure relates to a method for modification of mung bean protein and preparation of simulated egg pulp based on the modified protein, and belongs to the technical field of food processing.

BACKGROUND

Eggs, as an important part of various common foods, are often used in scrambled eggs, egg cakes or baked products, which not only are nutritious, but also can endow the products with viscoelasticity, gelling property, taste, flavor, nutrition and other desired characteristics. However, due to the problems that the eggs have high levels of cholesterol and saturated fat, a potential sensitization risk and a limited shelf life, development of high-quality vegetable protein-based simulated eggs that can replace animal proteins has become an urgent market demand.

At present, there are few researches on egg substitutes, and vegetable proteins such as wheat proteins, soybean proteins and black soybean proteins have been used as egg substitutes without wide application. Although the vegetable proteins, the wheat proteins and other gluten proteins used in current researches have good gelling property, allergies are likely to be caused by the gluten proteins. In addition, the soybean proteins, peanut proteins and the like often have allergens, so that wide application is limited. Mung bean proteins have rich nutrients, a high content of lysine, amino acid compositions similar to egg proteins and no allergens, so that the mung bean proteins are excellent vegetable proteins. The mung bean proteins not only have health care effects of improving lipid metabolism and lowering cholesterol, but also have good functional properties, and are viable choices for the vegetable proteins to replace the egg proteins. However, since the current commercial mung bean proteins have low solubility, prepared protein solutions have high viscosity, and emulsification activity and gel characteristics are also different from those of the egg proteins, so that an industrial production process has certain problems, and development and application of related products are limited. Therefore, it is necessary to conduct modification treatment on the commercial mung bean proteins to improve its application value.

At present, there are literature reports on application of a pH shift treatment technology to the soybean proteins, pea proteins and other vegetable proteins, especially low-protein systems (<5%). There is no research on application of pH shift treatment to a mung bean protein-based high-protein system, the main problem is that the vegetable-based high-protein system has ultra-high viscosity during pH shift, and a normal shift progress is affected. The gelling property of proteins is reduced by using treatment methods such as single enzymatic hydrolysis, which are commonly used in industry, so that the treatment methods are not suitable for preparation of simulated egg products.

In addition, there are fewer egg substitutes and researches on the market, most egg substitutes are in the form of mixtures, and there are almost no vegetable-based simulated egg pulp products in the form of emulsions. Main limiting factors include limited dissolution and emulsification capabilities of the vegetable proteins, low freeze-thawing and storage stability, easy precipitation of oil during refrigeration and freezing storage periods, protein aggregation and other problems. Therefore, preparation of an emulsion product with storage stability to improve the freeze-thawing and storage stability of the product is also an urgent problem to be solved by such vegetable-based egg substitutes.

SUMMARY

In order to solve the problems above, the present disclosure provides a method for compound modification of a mung bean protein and a method for preparing a mung bean protein-based simulated egg pulp. In the present disclosure, by combining pH shift with an ultrasonic treatment technology and a protein deaminase for compound modification, the problem that a vegetable-based high-protein system has ultra-high viscosity during the pH shift is solved, and functional properties of a modified mung bean protein are improved at the same time. The present disclosure also uses the modified mung bean protein to prepare a mung bean protein-based simulated egg pulp in the form of a high-stability emulsion, desired functions such as emulsification and gelling property of egg proteins are achieved, the simulated egg pulp has no allergens, mild molding conditions and moderate gel strength, little fat is precipitated during heating, uniformity and stability may still be maintained after low-temperature storage and multiple freeze-thawing for a long time, and the simulated egg pulp is suitable for industrial production, circulation and sales.

Specifically, a first objective of the present disclosure is to provide a method for compound modification of a mung bean protein isolate. The method includes: by using the mung bean protein isolate as a raw material, conducting pH shift modification, ultrasonic treatment and protein-glutaminase (PG enzyme) treatment for compound modification to prepare a modified mung bean protein isolate.

In an embodiment of the present disclosure, the mung bean protein isolate is a commercial mung bean protein isolate, which may be obtained commercially.

In an embodiment of the present disclosure, the method specifically includes: first, preparing a mung bean protein isolate solution with a mass fraction of 6% to 12%, adjusting the pH to 10-12, and conducting treatment at 20° C. to 30° C. for 10-60 minutes; then, adjusting the pH to 6-8, and conducting ultrasonic treatment with a frequency of 10-40 kHz for 10-60 minutes after pH shift is conducted; and next, adding a PG enzyme which is 0.1% to 1% of a mass of a mung bean protein isolate for treatment for 10-40 minutes, and then conducting enzyme deactivation and freeze-drying to obtain a modified mung bean protein isolate.

In an embodiment of the present disclosure, the pH shift refers to a process of adjusting the pH, that is, a process of adjusting the pH of the mung bean protein isolate solution to 10-12 and then adjusting the pH back to 6-8.

In an embodiment of the present disclosure, an added amount of the PG enzyme is preferably 0.1% to 0.5% of the mass of the mung bean protein isolate, and a treatment temperature is 30° C. to 50° C.

In an embodiment of the present disclosure, an ultrasonic cavitation effect and pH shift treatment are combined to act on the vegetable-based high-protein system to promote formation of soluble aggregates and micro-unfolding of a protein structure, the solubility of the protein is improved, the protein stays in a molten spherical state that a part of the structure is unfolded, and an effect that the high-protein system has ultra-high viscosity during shift is avoided; and compared with commonly used heat treatment, excessive protein denaturation is avoided, and an inactivation rate of microorganisms is effectively improved. By combining with PG enzyme treatment, the viscosity of the protein is significantly reduced. In addition, a protein obtained after ultrasonic treatment and pH shift treatment is a good substrate of a transglutaminase (TG enzyme), the mung bean protein has good fluidity and flavor after deamidation for a short time, and more TG enzyme action sites are exposed, so that a good structural basis is provided for processing of the simulated egg pulp in the next step.

A second objective of the present disclosure is to provide a modified mung bean protein isolate prepared by using the method above.

A third objective of the present disclosure is to provide a method for preparing a high-stability mung bean protein-based simulated egg pulp. The high-stability mung bean protein-based simulated egg pulp includes, by mass fraction, 6% to 12% of the modified mung bean protein isolate, 10% to 25% of edible vegetable oil, 0 to 0.1% of edible calcium chloride, 0 to 0.1% of an edible polysaccharide and the balance of water; and the method includes: first, adding the edible vegetable oil, the edible calcium chloride, the edible polysaccharide, a TG enzyme and water into the modified mung bean protein isolate, and then conducting high-speed emulsification and high-pressure homogenization to obtain the high-stability mung bean protein-based simulated egg pulp.

In an embodiment of the present disclosure, the edible vegetable oil refers to edible oil prepared by using an edible vegetable oil material or vegetable crude oil as a raw material and includes any one or more of rapeseed oil, sunflower oil, peanut oil, soybean oil, olive oil, palm oil, palm kernel oil and the like.

In an embodiment of the present disclosure, wherein the high-stability mung bean protein-based simulated egg pulp further includes an edible pigment and nisin.

In an embodiment of the present disclosure, the edible pigment is a food additive that can be consumed by humans in an appropriate amount and can change an original color of food to a certain extent and includes curcumin and carotene, and an added amount of the edible pigment is not greater than 0.05%; and an added amount of the nisin is 0-0.5 g/kg of the simulated egg pulp.

In an embodiment of the present disclosure, the edible polysaccharide includes one or more of gellan gum, xanthan gum, konjac gum and modified starch.

In an embodiment of the present disclosure, the edible calcium chloride is food-grade calcium chloride.

In an embodiment of the present disclosure, TG enzyme treatment conditions include that an added amount of the TG enzyme is 0.1% to 0.5% of a mass of the modified mung bean protein isolate, and heat preservation treatment is conducted at 30° C. to 50° C. for 30-60 minutes.

In an embodiment of the present disclosure, the high-speed emulsification includes high-speed shearing at a speed of 10,000-15,000 rpm for 2-10 minutes, and the high-pressure homogenization is conducted 2-4 times at a temperature of 20° C. to 30° C. under 15-35 MPa.

In an embodiment of the present disclosure, the method specifically includes the following steps:

1) taking the modified mung bean protein isolate, adding edible calcium chloride and a TG enzyme for uniform mixing, conducting heat preservation treatment at 30° C. to 50° C. for 30-60 minutes, and then conducting enzyme deactivation;

2) adding the edible vegetable oil, the edible polysaccharide, the edible pigment and the nisin into a resulting mixture for uniform mixing; and 3) conducting high-speed shearing emulsification on a resulting mixture, and then conducting high-pressure homogenization to obtain the high-stability mung bean protein-based simulated egg pulp.

A fourth objective of the present disclosure is to provide a high-stability mung bean protein-based simulated egg pulp prepared by using the preparation method above.

A fifth objective of the present disclosure is to provide application of the modified mung bean protein isolate or the high-stability mung bean protein-based simulated egg pulp in the food field.

A sixth objective of the present disclosure is to provide a method for preparing a scrambled egg or an egg tart. The high-stability mung bean protein-based simulated egg pulp is used in the method for preparation.

In an embodiment of the present disclosure, a method for preparing a scrambled egg by using a high-stability mung bean protein-based simulated egg pulp includes: taking an appropriate amount of the simulated egg pulp, adding a small amount of water or no water, and then conducting heating in a nonstick hot pan with cold oil and moderate heat for 4-6 minutes to obtain a mung bean protein-based scrambled egg product.

In an embodiment of the present disclosure, a method for preparing an egg tart by using a high-stability mung bean protein-based simulated egg pulp includes: taking an appropriate amount of the simulated egg pulp, mixing the simulated egg pulp with milk at a ratio of 1:1 to 3:1, adding an appropriate amount of sucrose, and then conducting baking in an oven with an upper and lower fire at 200° C. for 15-20 minutes to obtain a mung bean protein-based egg tart product.

The present disclosure has the following beneficial effects:

(1) In the present disclosure, by combining the pH shift with the ultrasonic treatment technology and the protein deaminase for compound modification, the problem that the vegetable-based high-protein system has ultra-high viscosity during the pH shift process is solved, and functional properties of the modified mung bean protein are improved at the same time; and the prepared modified mung bean protein has good solubility, emulsifying property and gelling property, so that the functional properties of the commercial mung bean protein are greatly improved, and the application range is expanded.

(2) In the present disclosure, the simulated egg pulp prepared from the modified mung bean protein is in the form of a stable emulsion with good fluidity, and uniformity and stability may still be maintained after low-temperature storage and multiple freeze-thawing for a long time; in addition, the simulated egg pulp has no allergens, mild molding conditions and moderate gel strength and may be rapidly molded after heating at a medium temperature of 60° C. to 80° C. for a short time (2-5 minutes), and little fat is precipitated during heating; and the simulated egg pulp has good freeze-thawing and storage stability and higher stability than existing egg substitutes and is more suitable for industrial production, circulation and sales, and excellent health care effects and functional properties of the mung bean protein may be achieved at the same time, making the mung bean protein be an excellent substitute for animal protein resources.

BRIEF DESCRIPTION OF FIGURES

FIG. 4A shows the emulsions prepared from an unmodified mung bean protein isolate, and FIG. 4B shows the emulsions prepared from a modified mung bean protein isolate.

FIG. 6A and FIG. 6B are diagrams showing the appearance of emulsions prepared from a modified mung bean protein isolate after freeze-thawing; FIG. 6C and FIG. 6D are diagrams showing the appearance of emulsions prepared from an unmodified mung bean protein isolate after freeze-thawing; and FIG. 6E is a diagram showing the appearance of a competitive product of a vegetable-based egg pulp after freeze-thawing on the market at present.

FIG. 7A, FIG. 7B, FIG. 7C and FIG. 7D are diagrams showing the appearance of the finished products of scrambled eggs obtained by using formulas in Examples 5 to 8 respectively.

FIG. 8A and FIG. 8B are diagrams showing the appearance of the finished products of egg tarts obtained by using formulas in Examples 5 to 6 respectively.

DETAILED DESCRIPTION

Figure 1:
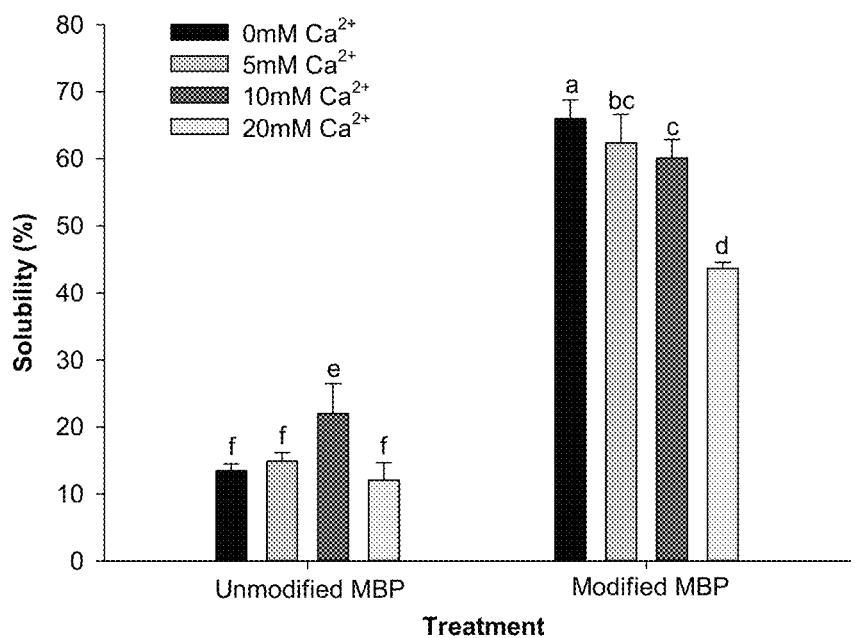
FIG. 1 is a comparison diagram showing the solubility of modified and unmodified mung bean protein isolates under different concentrations of a coagulant edible calcium chloride. Mung bean protein isolate is defined as "MBP".

A viscosity determination method: A Brookfield DV2T rotational viscometer with a NO. 62 rotor is used.

An emulsification activity determination method: A turbidimetric method is used. A prepared emulsion is quickly poured into a 25 mL small beaker, 20 μL of the emulsion is immediately taken at a place 5 mm away from the bottom of the beaker and then added into a test tube, 5 mL of a 0.1% SDS solution is added into the test tube for uniform mixing, and an absorbance value ($A_0$) is determined at 500 nm.

Emulsification activity is expressed as EAI (m²/g) =$2*2.303*A_0*N/[C*(1-\Phi)*10^4]$.

In the formula: N refers to a dilution multiple, C refers to a concentration of a protein in an aqueous protein solution before the emulsion is formed (g/mL), and Φ refers to a volume fraction of oil in the emulsion (L/L).

The following examples are used to further describe the present disclosure, but embodiments of the present invention are not limited thereto.

Description of the following examples is only used to help understand the core idea of the present disclosure, and any obvious modifications, equivalent replacements or other improvements made without departing from the concept of the present disclosure shall be included in the protection scope of the present disclosure.

In all the shown and described examples, any specific value is only exemplary and is not used as a limitation, and other examples of exemplary embodiments may have different values.

A mung bean protein isolate is purchased from Yantai Shuangta Food Co., Ltd. (Yantai, Shandong, China), a protein-glutaminase (PG enzyme) is purchased from Amano Enzyme Inc. (Aichi, Nagoya, Japan), a transglutaminase (TG enzyme) is purchased from Jiangsu Yiming Biological Co., Ltd. (Taixing, Jiangsu, China), and edible calcium chloride and nisin are purchased from Shanghai Titan Scientific Co., Ltd. (Shanghai, China).

Several preferred implementation methods for compound modification of a mung bean protein isolate are shown in Examples 1 to 4, and specific parameters are as follows.

Example 1

An 8% mung bean protein isolate solution was prepared, the pH of the solution was adjusted to 11, and treatment was conducted for 50 minutes; ultrasonic treatment was conducted under 20 kHz for 40 minutes after pH shift was conducted, and the pH of the solution was adjusted back to 7; and then a 0.5% protein-glutaminase (PG enzyme) was added, heat preservation was conducted at 45° C. for 20 minutes, and finally enzyme deactivation and freeze-drying were conducted to obtain a modified mung bean protein isolate.

Example 2

A 10% mung bean protein isolate solution was prepared, the pH of the solution was adjusted to 12, and treatment was conducted for 40 minutes; ultrasonic treatment was conducted under 20 kHz for 30 minutes after pH shift was conducted, and the pH of the solution was adjusted back to 7; and then a 0.3% PG enzyme was added, heat preservation was conducted at 45° C. for 30 minutes, and finally enzyme deactivation and freeze-drying were conducted to obtain a modified mung bean protein isolate.

Example 3

An 8% mung bean protein isolate solution was prepared, the pH of the solution was adjusted to 10, and treatment was conducted for 60 minutes; ultrasonic treatment was conducted under 20 kHz for 40 minutes after pH shift was conducted, and the pH of the solution was adjusted back to 7; and then a 1% PG enzyme was added, heat preservation was conducted at 45° C. for 15 minutes, and finally enzyme deactivation and freeze-drying were conducted to obtain a modified mung bean protein isolate.

Example 4

A 6% mung bean protein isolate solution was prepared, the pH of the solution was adjusted to 12, and treatment was conducted for 20 minutes; ultrasonic treatment was conducted under 40 kHz for 10 minutes after pH shift was conducted, and the pH of the solution was adjusted back to 6; and then a 0.1% PG enzyme was added, heat preservation was conducted at 45° C. for 40 minutes, and finally enzyme deactivation and freeze-drying were conducted to obtain a modified mung bean protein isolate.

The viscosity of the modified mung bean protein isolate prepared in Example 1 and an unmodified mung bean protein isolate was determined, and results were shown in Table 1. It can be seen that the viscosity of the mung bean protein isolate could be greatly reduced to 12 mPa·s by combined modification treatment in the present disclosure.

TABLE 1

Numerical table of viscosity of modified and unmodified mung bean protein solutions

| Group | Viscosity of protein solution (mPa · s) |
| --- | --- |
| No modification treatment | 468.60 ± 4.18 |
| Combined modification treatment | 12.06 ± 1.31 |

Figure 2:
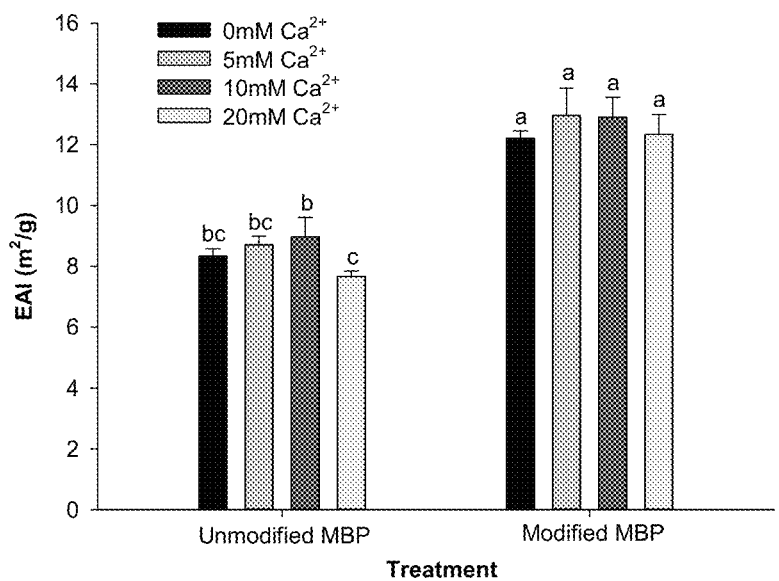
FIG. 2 is a comparison diagram showing the emulsification activity of modified and unmodified mung bean protein isolates under different concentrations of the coagulant edible calcium chloride.

The solubility and emulsification activity of the modified mung bean protein isolate prepared in Example 1 and an unmodified mung bean protein isolate under different concentrations of a coagulant edible calcium chloride were determined, and results were shown in FIG. 1 and FIG. 2 respectively. It can be seen from the figure that the solubility of the modified mung bean protein isolate was significantly improved by 65%. Moreover, the emulsification activity of the modified mung bean protein isolate was also significantly improved.

In addition, by comparing with Comparative Example 1 and Comparative Example 2, it can be seen that the viscosity, solubility and emulsification activity of the mung bean protein isolate obtained after combined modification treatment of pH shift, ultrasonic treatment and PG treatment could be significantly improved. When the pH shift was only combined with the ultrasonic modification treatment, although the viscosity of a protein solution could be reduced to a certain extent, the gel strength of a product prepared in a subsequent step was affected. However, the gel strength of a simulated egg pulp prepared from a mung bean protein isolate liquid prepared in the present disclosure was greatly improved.

Figure 3:
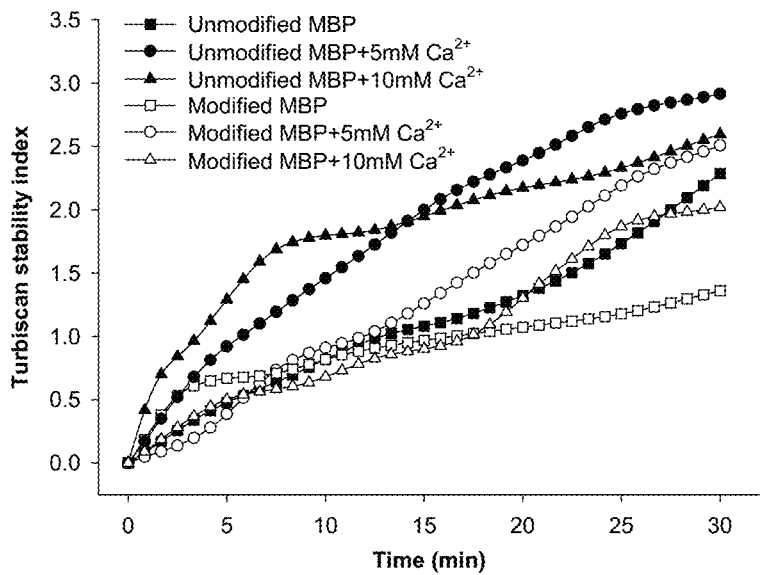
FIG. 3 is a diagram showing the stability of emulsions prepared from modified and unmodified mung bean protein isolates under different concentrations of the coagulant edible calcium chloride.

The stability of emulsions prepared from the modified mung bean protein isolate prepared in Example 1 and an unmodified mung bean protein isolate under different concentrations of the coagulant edible calcium chloride was determined, Turbiscan stability index (TSI) data were measured at 30° C. for 30 minutes, and results were shown in FIG. 3. It can be seen that the emulsions prepared from the modified mung bean protein had good stability.

Figure 4A:
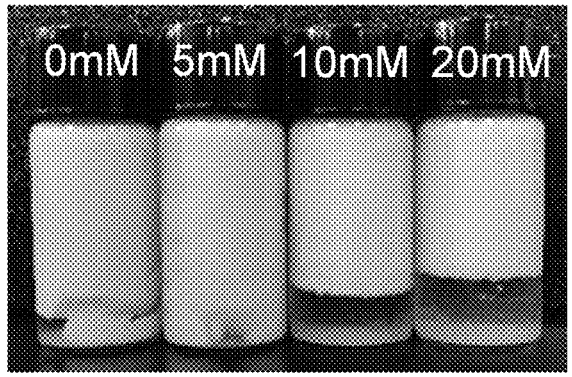
FIG. 4A-B is a diagram showing the appearance of emulsions prepared from modified and unmodified mung bean protein isolates under different concentrations of the coagulant edible calcium chloride after storage, where
Figure 4B:
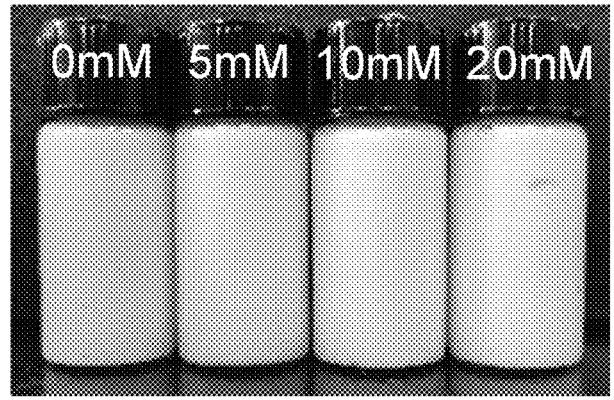
Figure 5:
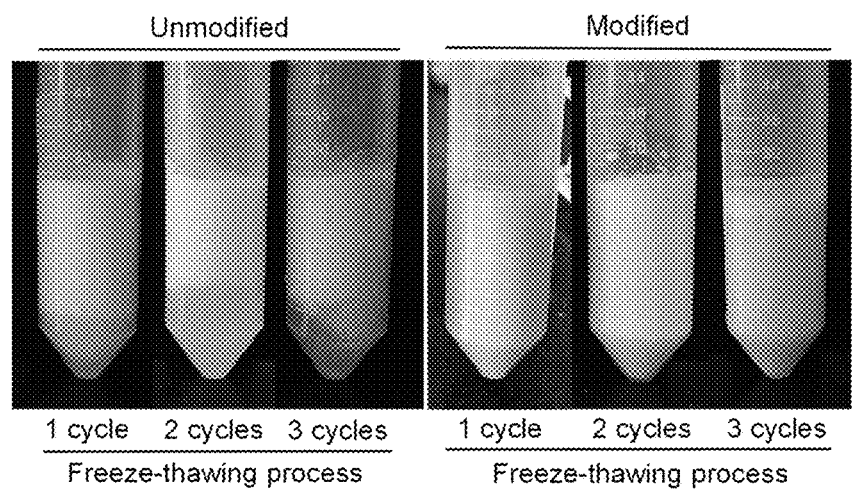
FIG. 5 is a diagram showing the appearance of emulsions prepared from modified and unmodified mung bean protein isolates after multiple freeze-thawing process.

The storage performance of emulsions prepared from modified and unmodified mung bean protein isolates under different concentrations of the coagulant edible calcium chloride was determined, and the emulsions were stored at a temperature of 4° C. for 10 days. The appearance of the emulsions after storage is shown in FIG. 4A-B, where FIG. 4A shows the appearance of the emulsions prepared from an unmodified mung bean protein isolate under different concentrations of a common coagulant after storage, and FIG. 4B shows the appearance of the emulsions prepared from a modified mung bean protein isolate after storage (from left to right, the emulsions were prepared under conditions of 0/5/10/20 mM calcium chloride). It can be seen from the figure that the emulsions prepared from a modified mung bean protein were not layered and were stable after storage for 10 days, and the emulsions prepared from an unmodified mung bean protein were obviously layered. FIG. 5 is a diagram showing the appearance of emulsions prepared from modified and unmodified mung bean protein isolates after multiple freeze-thawing, and it can be seen that the modified mung bean protein isolates of the present disclosure had good freeze-thawing performance.

It can be seen that by combining the pH shift with an ultrasonic treatment technology and a protein deaminase for compound modification, the problem that a vegetable-based high-protein system has ultra-high viscosity during the pH shift is solved, and functional properties of the modified mung bean protein are improved at the same time; and the prepared modified mung bean protein has good solubility, emulsifying property and gelling property, so that the functional properties of the commercial mung bean protein are greatly improved.

Preferred specific embodiments of a preparation process of a mung bean protein-based simulated egg pulp are shown in Examples 5 to 9, and specific parameters are as follows.

Example 5

In this example, a mung bean protein-based simulated egg pulp was prepared by using the following method, and the method specifically included the following steps.

1) The modified mung bean protein isolate obtained in Example 1 was taken and prepared into a protein solution with a mass fraction of 10%, 0.1% of edible calcium chloride and 0.2% of a TG enzyme were added for uniform mixing, heat preservation treatment was conducted at 50° C. for 30 minutes, and then enzyme deactivation was conducted.

2) 10% of rapeseed oil, 0.1% of gellan gum, 0.05% of an edible pigment (mixed by curcumin and carotene at a ratio of 1:1) and 0.2 g/kg of nisin were added into a resulting mixture for uniform mixing.

3) High-speed shearing was conducted on a resulting mixture at a speed of 15,000 rpm for 2 minutes, and then high-pressure homogenization was conducted twice at a temperature of 25° C. under 20 MPa to obtain the high-stability mung bean protein-based simulated egg pulp.

Example 6

In this example, a mung bean protein-based simulated egg pulp was prepared by using the following method, and the method specifically included the following steps.

1) The modified mung bean protein isolate obtained in Example 2 was taken and prepared into a protein solution with a mass fraction of 8%, 0.05% of edible calcium chloride and 0.3% of a TG enzyme were added for uniform mixing, heat preservation treatment was conducted at 50° C. for 30 minutes, and then enzyme deactivation was conducted.

2) 15% of peanut oil, 0.05% of konjac gum, 0.05% of an edible pigment (mixed by curcumin and carotene at a ratio of 1:1) and 0.2 g/kg of nisin were added into a resulting mixture for uniform mixing.

3) High-speed shearing was conducted on a resulting mixture at a speed of 15,000 rpm for 2 minutes, and then high-pressure homogenization was conducted twice at a temperature of 25° C. under 30 MPa to obtain the high-stability mung bean protein-based simulated egg pulp.

Example 7

In this example, a mung bean protein-based simulated egg pulp was prepared by using the following method, and the method specifically included the following steps.

1) The modified mung bean protein isolate obtained in Example 3 was taken and prepared into a protein solution with a mass fraction of 6%, 0.1% of edible calcium chloride and 0.3% of a TG enzyme were added for uniform mixing, heat preservation treatment was conducted at 50° C. for 30 minutes, and then enzyme deactivation was conducted.

2) 20% of palm oil, 0.05% of xanthan gum, 0.05% of an edible pigment (mixed by curcumin and carotene at a ratio of 1:1) and 0.2 g/kg of nisin were added into a resulting mixture for uniform mixing.

3) High-speed shearing was conducted on a resulting mixture at a speed of 15,000 rpm for 2 minutes, and then high-pressure homogenization was conducted four times at a temperature of 25° C. under 35 MPa to obtain the high-stability mung bean protein-based simulated egg pulp.

Example 8

In this example, a mung bean protein-based simulated egg pulp was prepared by using the following method, and the method specifically included the following steps.

1) The modified mung bean protein isolate obtained in Example 4 was taken and prepared into a protein solution with a mass fraction of 8%, 0.1% of edible calcium chloride and 0.3% of a TG enzyme were added for uniform mixing, heat preservation treatment was conducted at 50° C. for 30 minutes, and then enzyme deactivation was conducted.

2) 15% of soybean oil, 0.05% of modified starch, 0.05% of an edible pigment (mixed by curcumin and carotene at a ratio of 1:1) and 0.2 g/kg of nisin were added into a resulting mixture for uniform mixing.

3) High-speed shearing was conducted on a resulting mixture at a speed of 15,000 rpm for 2 minutes, and then high-pressure homogenization was conducted four times at a temperature of 25° C. under 35 MPa to obtain the high-stability mung bean protein-based simulated egg pulp.

When a mung bean protein isolate was not modified, a simulated egg pulp was prepared by using the method in Example 5 and compared with the simulated egg pulp prepared in Example 5 in characteristics.

Figure 6A:
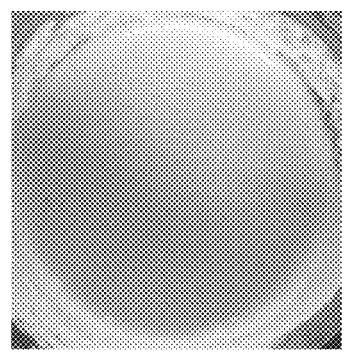
FIG. 6A-E is a diagram showing the appearance of mung bean protein isolate-based simulated egg pulp products under different formula conditions after freeze-thawing, where
Figure 6B:
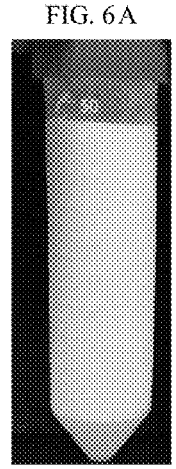
Figure 6C:
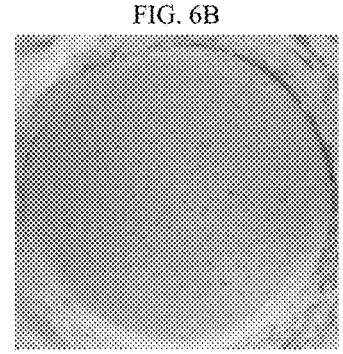
Figure 6D:
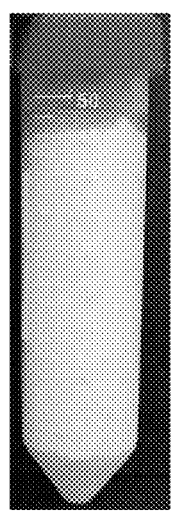
Figure 6E:
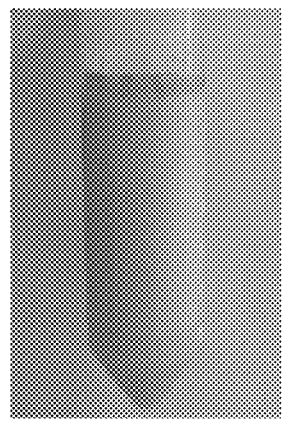

FIG. 6A-E is a diagram showing the appearance of mung bean protein-based simulated egg pulp products under different formula conditions after freeze-thawing, where FIG. 6A and FIG. 6B are diagrams showing the appearance of emulsions prepared from the modified mung bean protein isolate (in Example 5) after freeze-thawing; and FIG. 6C and FIG. 6D are diagrams showing the appearance of emulsions prepared from an unmodified mung bean protein isolate after freeze-thawing. FIG. 6E is a diagram showing the appearance of a vegetable-based egg pulp product after freeze-thawing on the market at present. It can be seen from the figure that the simulated egg pulps prepared from the modified mung bean protein isolate after freeze-thawing had no obvious phenomenon that oil was precipitated. The simulated egg pulps prepared from the unmodified mung bean protein isolate after freeze-thawing had an obvious phenomenon that oil was precipitated in an upper layer, and the vegetable-based egg pulp product after freeze-thawing on the market at present also had an obvious phenomenon that oil was precipitated with an aggregated precipitate in a lower layer. It can be seen that the simulated egg pulp prepared in the present disclosure had good freeze-thawing and storage stability.

Example 9

In this example, a mung bean protein-based simulated egg pulp was prepared by using the following method, and the method specifically included the following steps.

1) The modified mung bean protein isolate obtained in Example 1 was taken and prepared into a protein solution with a mass fraction of 10%, 0.1% of edible calcium chloride and 0.2% of a TG enzyme were added for uniform mixing, heat preservation treatment was conducted at 50° C. for 30 minutes, and then enzyme deactivation was conducted.

2) 10% of rapeseed oil, 0.1% of gellan gum, 0.05% of an edible pigment (mixed by curcumin and carotene at a ratio of 1:1) and 0.2 g/kg of nisin were added into a resulting mixture for uniform mixing.

3) High-speed shearing was conducted on a resulting mixture at a speed of 10,000 rpm for 10 minutes, and then high-pressure homogenization was conducted twice at a temperature of 25° C. under 20 MPa to obtain the high-stability mung bean protein-based simulated egg pulp.

Example 10

Figure 7A:
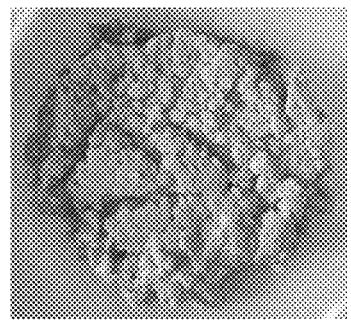
FIG. 7A-D is a diagram showing the appearance of finished products of scrambled eggs prepared from mung bean protein isolate-based simulated egg pulps, where
Figure 7B:
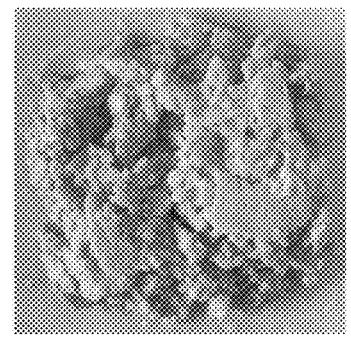
Figure 7C:
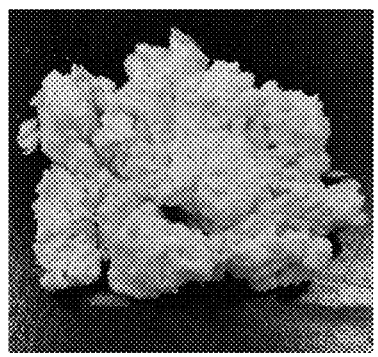
Figure 7D:
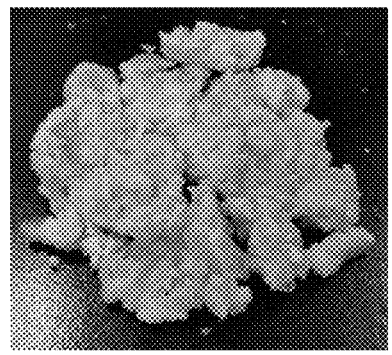

A method for preparing a scrambled egg by using a high-stability mung bean protein-based simulated egg pulp included the following steps. An appropriate amount of the simulated egg pulp prepared in Example 5 or 6 was taken and then heated in a nonstick hot pan with cold oil and moderate heat for 4-6 minutes to obtain a mung bean protein-based scrambled egg product. The product was shown in FIG. 7A-D (where FIG. 7A and FIG. 7B show products prepared from a modified protein obtained in Example 5, and FIG. 7C and FIG. 7D show products prepared from a modified protein obtained in Example 6).

It can be seen from the figure that mung bean protein-based scrambled eggs prepared from the modified proteins obtained in Examples 5 and 6 had good moldability, color and appearance which was very similar to that of a traditional scrambled egg. In addition, the mung bean protein-based scrambled egg prepared from the modified protein obtained in Example 6 had better gelling properties than a product prepared from the modified protein obtained in Example 5.

Example 11

Figure 8A:
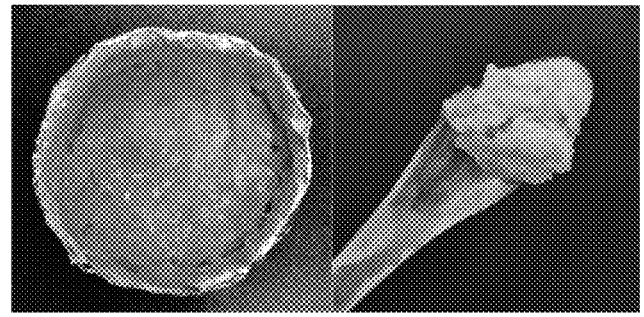
FIG. 8A-B is a diagram showing the appearance of finished products of egg tarts prepared from mung bean protein isolate-based simulated egg pulps, where
Figure 8B:
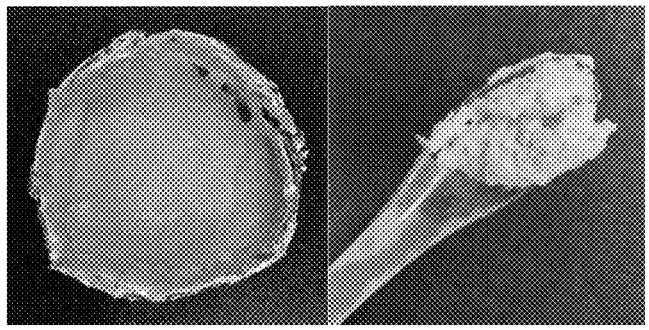

A method for preparing an egg tart by using a high-stability mung bean protein-based simulated egg pulp included the following steps. An appropriate amount of the simulated egg pulp prepared in Example 5 or 6 was taken and then mixed with milk at a ratio of 2:1, an appropriate amount of sucrose was added, and then baking was conducted in an oven with an upper and lower fire at 200° C. for 15 minutes to obtain a mung bean protein-based egg tart product. The product was shown in FIG. 8A-B (where FIG. 8A shows a product prepared from a modified protein obtained in Example 5, and FIG. 8B shows a product prepared from a modified protein obtained in Example 6). It can be seen from the figure that mung bean protein-based egg tarts prepared from the modified proteins obtained in Examples 5 and 6 had good moldability and appearance which was very similar to that of a traditional egg tart, and gel in the mung bean protein-based egg tarts was fine in texture and elastic.

Comparative Example 1

An 8% mung bean protein isolate solution was prepared, the pH of the solution was adjusted to 11, and treatment was conducted for 50 minutes; and ultrasonic treatment was conducted under 20 kHz for 40 minutes after pH shift was conducted, the pH of the solution was adjusted back to 7, and then freeze-drying was conducted to obtain a modified mung bean protein isolate.

The viscosity of the modified mung bean protein isolate prepared in Comparative Example 1 and an unmodified mung bean protein isolate was determined, and results were shown in Table 2. It can be seen that the viscosity of the mung bean protein isolate could be greatly reduced by combination of the pH shift and ultrasonic modification treatment and was far higher than that of the composite modification treatment group in Example 1. In addition, after the mung bean protein isolate only subjected to combination of the pH shift and the ultrasonic treatment was subjected to the same treatment in Examples 5 to 8, an action rate of a TG enzyme was reduced in a subsequent step without PG enzyme treatment, and the strength of formed gel was low (as shown in Table 3).

TABLE 2

Numerical table of viscosity of an unmodified mung bean protein solution and a modified mung bean protein solution obtained by combination of pH shift and ultrasonic modification

| Group | Viscosity of protein solution (mPa · s) |
| --- | --- |
| No modification treatment | 468.60 ± 4.18 |
| Combination of pH shift and ultrasonic modification | 112.06 ± 3.25 |

TABLE 3

Numerical table of gel strength of simulated egg pulps obtained by modification with different combinations of pH shift, ultrasonic treatment and PG enzyme treatment

| | Gel strength (g) | | | |
| --- | --- | --- | --- | --- |
| Group | Example 5 | Example 6 | Example 7 | Example 8 |
| Dual treatment of pH shift and ultrasonic treatment | 188.00 ± 5.07 | 139.00 ± 0.50 | 129.50 ± 1.89 | 166.33 ± 7.41 |
| Triple modification of pH shift, ultrasonic treatment and PG enzyme treatment | 448.50 ± 2.05 | 335.50 ± 9.25 | 281.50 ± 5.40 | 353.17 ± 5.67 |

Comparative Example 2

An 8% mung bean protein isolate solution was prepared, a 0.5% PG enzyme was added, heat preservation was conducted at 45° C. for 20 minutes, and then enzyme deactivation treatment was conducted to obtain a modified mung bean protein isolate.

After the modified mung bean protein isolate obtained only after PG enzyme treatment in Comparative Example 2 was treated under conditions in Examples 5 to 9, gel was not formed.

Although the present disclosure has been disclosed above in preferred examples, the examples are not intended to limit the present disclosure. Various changes and modifications can be made by those skilled in the art without departing from the spirit and scope of the present disclosure. Therefore, the protection scope of the present disclosure shall be defined by the claims.

What is claimed is:

1. A method of modifying mung bean protein isolate, which comprises:
    (a) adjusting pH of the mung bean protein isolate to 10 to 12, heating the mung bean protein isolate at 20° C. to 30° C. for 10 to 60 minutes, adjusting the pH of the mung bean protein isolate to 6 to 8, wherein said mung bean protein isolate has a mass fraction of 6% to 12%,
    (b) treating the mung bean protein isolate of step (a) with ultrasound, which comprises exposing the mung bean protein isolate of step (a) to ultrasound at a frequency of 10 kHz to 40 kHz for 10 to 60 minutes,
    (c) incubating a protein-glutaminase (PG) enzyme with the mung bean protein isolate of step (b) at 0.1% to 1% of a mass of the mung bean protein isolate for 10 to 40 minutes,
    (d) deactivating the PG enzyme to obtain a modified mung bean protein isolate, and
    (e) freeze-drying the modified mung bean protein isolate of step (d).

2. The modified mung bean protein isolate prepared by the method according to claim 1.

3. A method for preparing a mung bean protein-based simulated egg pulp, wherein the mung bean protein-based simulated egg pulp comprises, by mass fraction:
    6% to 12% of the modified mung bean protein isolate of claim 2,
    10% to 25% of edible vegetable oil,
    0 to 0.1% of edible calcium chloride,
    0 to 0.1% of an edible polysaccharide, and
    water,
    the method comprising:
    (i) forming a composition by adding the edible vegetable oil, the edible calcium chloride, the edible polysaccharide, a transglutaminase (TG enzyme), and the water to the modified mung bean protein isolate,
    (ii) emulsifying the composition of step (i) to form an emulsified composition, and
    (iii) homogenizing the emulsified composition.

4. The method according to claim 3, wherein the mung bean protein-based simulated egg pulp further comprises an edible pigment and nisin.

5. The method according to claim 4, wherein the edible pigment is added in an amount not greater than 0.05%; and wherein the nisin is added in an amount of 0 g/kg to 0.50 g/kg of the mung bean protein-based simulated egg pulp.

6. The method according to claim 3, wherein the edible polysaccharide comprises one or more of gellan gum, xanthan gum, konjac gum and modified starch.

7. The method according to claim 3, wherein the edible vegetable oil comprises any one or more of rapeseed oil, sunflower oil, peanut oil, soybean oil, olive oil, palm oil, and palm kernel oil.

8. The method according to claim 3, wherein the emulsifying comprises shearing for 2 to 10 minutes, and wherein homogenizing is conducted 2 to 4 times at a temperature of 20° C. to 30° C. under 15 MPa to 35 MPa pressure.

9. The method according to claim 3, wherein in step (ii) the edible calcium chloride and the TG enzyme is first added to the modified mung bean protein isolate followed by heating at 30° C. to 50° C. for 30 to 60 minutes, and then deactivating the TG enzyme; and
    wherein the edible vegetable oil, the edible polysaccharide, the edible pigment, and nisin are then added to form the composition.

* * * * *